T. E. MURRAY.
SHEET METAL SLEEVE.
APPLICATION FILED DEC. 14, 1916.

1,267,250.

Patented May 21, 1918.

Inventor
Thomas E. Murray
By his Attorney

UNITED STATES PATENT OFFICE.

THOMAS E. MURRAY, OF NEW YORK, N. Y.

SHEET-METAL SLEEVE.

1,267,250.

Specification of Letters Patent. Patented May 21, 1918.

Application filed December 14, 1916. Serial No. 136,865.

*To all whom it may concern:*

Be it known that I, THOMAS E. MURRAY, a citizen of the United States, residing at New York, in the county of New York and State of New York, have invented a certain new and useful Improvement in Sheet-Metal Sleeves, of which the following is a specification.

The invention is a sleeve of sheet metal having an internal screw thread, and produced wholly by stamping or striking up suitable blanks and uniting the parts by an electrically welded joint.

In the accompanying drawings—

Figure 1:
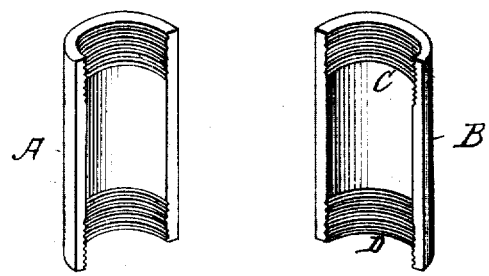
Figure 2:
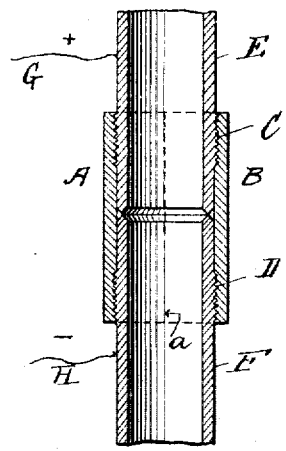
Figure 3:
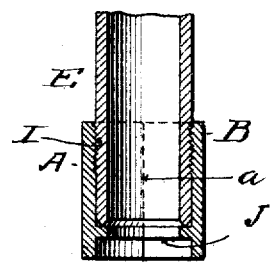

Figure 1 shows in perspective the two half sections which, when united as hereinafter described, form a coupling sleeve. Fig. 2 is a longitudinal section of said sleeve, showing two tubes in place therein. Fig. 3 is a similar section of a sleeve having an internal rib, to which the inserted tube is butt-welded.

Similar letters of reference indicate like parts.

From similar sheet metal blanks of suitable dimensions I produce by stamping or striking up, two precisely similar half sections A, B of semi-cylindrical form, each section being internally threaded. The threads are to be formed and the plates bent by the same striking up or stamping operation. Where the sleeve is to be used as a coupling, I strike up two threads, as C, D, to receive respectively the tubes E, F to be connected.

The sections A, B being placed with their longitudinal edges in contact, I unite said edges by an electrically welded joint, indicated at *a*, Figs. 2 and 3. The screw threads on one-half section then register with the screw threads on the other half section. The tubes E, F are externally threaded to engage with the threads C, D, Fig. 2. Their inner abutting ends may be chamfered off.

The terminals G, H of a source of welding current may be connected respectively to said tubes to produce a welded joint between said abutting ends.

Where the sleeve is to be used as a socket, reinforcing ring or the like on the end of a tube, I make each half section with a single thread I and an internal rib or shoulder J, Fig. 3. The threaded tube E then bears at its end against said shoulder. The terminals G, H from the source of welding current in this case are connected to tube E and the sleeve, and an electrically welded joint is produced between the butt end of the tube and the rib J.

As the sections A, B are interchangeable, it will, of course, be obvious that they can be made in die presses in large quantities, and that any two units may be put together to form the sleeve; also that the uniting is effected by a single electrically welded joint, which is produced practically instantaneously. The sleeve thus made is very much cheaper and at the same time stronger than the sleeves or couplings of cast metal in common use.

I claim:

1. A sleeve, comprising two longitudinally divided half sections and having an internal screw thread and an internal shoulder, each section, together with the portion of the screw thread and shoulder thereon being struck up from a metal plate, the screw threads and shoulder on one section registering with the screw threads and shoulder on the other section, and the said sections being electrically welded together at their longitudinal edges.

2. A sleeve as in claim 1, in combination with a tube engaging said screw thread and electrically welded to said shoulder.

In testimony whereof I have affixed my signature in presence of two witnesses.

THOMAS E. MURRAY.

Witnesses:
GERTRUDE T. PORTER,
MAY T. McGARRY.